United States Patent
Leung et al.

(10) Patent No.: US 9,367,140 B2
(45) Date of Patent: Jun. 14, 2016

(54) KEYBOARD DEVICE AND ELECTRONIC DEVICE

(71) Applicant: Quanta Computer Inc., Kuei Shan Hsiang, Tao Yuan Shien (TW)

(72) Inventors: Chee-Chun Leung, Tao Yuan Shien (TW); Yun-Cheng Liu, Tao Yuan Shien (TW); Chien-Hung Lin, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 326 days.

(21) Appl. No.: 13/948,024

(22) Filed: Jul. 22, 2013

(65) Prior Publication Data

US 2014/0062890 A1   Mar. 6, 2014

(30) Foreign Application Priority Data

Aug. 28, 2012   (TW) .............................. 101131109 A

(51) Int. Cl.
*G06F 3/02* (2006.01)
*G06F 3/01* (2006.01)
*G06F 3/0484* (2013.01)

(52) U.S. Cl.
CPC .............. *G06F 3/0213* (2013.01); *G06F 3/017* (2013.01); *G06F 3/021* (2013.01); *G06F 3/0484* (2013.01)

(58) Field of Classification Search
CPC ....... G06F 3/017; G06F 3/021; G06F 3/0484; G06F 3/0213
See application file for complete search history.

(56) References Cited

U.S. PATENT DOCUMENTS

| 8,902,280 | B2 | 12/2014 | Robinson et al. | |
| 2011/0006991 | A1* | 1/2011 | Elias | G06F 1/1662 345/168 |
| 2011/0102570 | A1* | 5/2011 | Wilf et al. | 348/77 |
| 2011/0221666 | A1* | 9/2011 | Newton | G06F 3/017 345/156 |
| 2011/0291935 | A1* | 12/2011 | Liu | 345/168 |
| 2012/0200494 | A1* | 8/2012 | Perski et al. | 345/156 |
| 2013/0257734 | A1* | 10/2013 | Marti et al. | 345/168 |

FOREIGN PATENT DOCUMENTS

| CN | 102577368 | 7/2012 |
| TW | 200951765 | 12/2009 |

OTHER PUBLICATIONS

Chinese language office action dated Dec. 30, 2015, issued in application No. CN 201210349602.9.

* cited by examiner

*Primary Examiner* — Aneeta Yodichkas
*Assistant Examiner* — Richard Hong
(74) *Attorney, Agent, or Firm* — McClure, Qualey & Rodack, LLP

(57) ABSTRACT

A keyboard device includes an operation surface. One long side of the operation surface is referred to as a proximal side, which nears a user operating the keyboard device; and the other long side is referred to as a distal side. A key unit is positioned on the proximal side, wherein the key unit includes a plurality of keys. A camera module is positioned on the distal side. An angle between a border of a field of view of the light sensor and the operation surface is set at a particular angle thus user's hand lays outside the field of view of the light sensor when the user is manipulating the key unit.

12 Claims, 5 Drawing Sheets

KEYBOARD DEVICE AND ELECTRONIC DEVICE

CROSS REFERENCE TO RELATED APPLICATIONS

This application claims priority of Taiwan Patent Application Ser. No. 101131109, filed Aug. 28, 2012, entitled KEYBOARD DEVICE AND ELECTRONIC DEVICE. The contents of this application are hereby incorporated by reference.

BACKGROUND OF THE INVENTION

1. Field of the Invention

The disclosure relates generally to keyboard integrated with camera module, through which a user can control a computer device associated with the keyboard by gestures.

2. Description of the Related Art

Recently, laptop computer associated with touch panel has become popular. Using this touch-enabled laptop computer, a user can control the touch-enabled laptop computer by way of touch-panel gestures. For example, a user can do things like swipe left from the right edge of a screen to direct the screen to display a previous page, or swipe right from the left edge of a screen to direct the screen display a next page.

When a touch-panel gesture is to be input during typing, a user has to stop typing and lift his hand from keyboard to touch panel in order to input the touch-panel gesture. In this case, the user has to move his hand to and from the touch panel. This is inconvenient for the user.

Accordingly, there is a need for more user-friendly device associated with a keyboard that enables a user to control the device using gestures.

BRIEF SUMMARY OF INVENTION

The disclosed device is a user-friendly device associated with a keyboard that enables a user to control the device using non-touch panel gestures.

According to a first respect of the invention, a keyboard device is provided. The keyboard device comprises a substantially rectangular operation surface, scancode output unit, and image output unit. In the operation surface, one long side is referred to as a proximal side, and he other long side is referred to as a distal side. The proximal side nears a user operating the keyboard device; and the distal side is the opposite side. The operation surface comprises a key unit and camera module. The key unit is positioned on the proximal side, wherein the key unit comprises a plurality of keys. The camera module is positioned on center of the distal side, wherein the camera comprises an active light emitter and a light sensor. The active light emitter emits light of a preset wave length. The light sensor detects light of the preset wave length. An angle between a border of a field of view of the light sensor and the operation surface is set at a particular angle thus user's hand is kept out of the field of view of the light sensor when the user's hand is manipulating the key unit. The scancode output unit outputs a scancode corresponding to the key being pressed. The image output unit outputs the image taken by the camera module.

In accordance with some embodiments, the active light emitter emits infrared light, and the light sensor detects the infrared light.

In accordance with some embodiments, the light sensor is positioned in a way by which when the user raises at least one finger and lays the rest part of the corresponding hand on the operation surface; the raised finger enters the field of view of the light sensor.

In accordance with some embodiments, the keyboard device further comprises a signal generator. The signal generator generates a control signal according to an image taken by the camera module, and transmits the control signal to an electronic device associated with the keyboard device. The signal generator generates the control signal according to a gesture identified in the image taken by the camera module, and transmits the control signal to the electronic device associated with the keyboard device to direct the electronic device to switch to a corresponding gesture input mode. When no gesture is identified in the taken image, the signal generator generates and transmits the control signal to the electronic device associated with the keyboard device to direct the electronic device to switch to a corresponding key input mode.

According to a second respect of the invention, an electronic device is provided. The electronic device comprises a keyboard and a processor. The keyboard comprises a substantially rectangular operation surface. In the operation surface, one long side is referred to as a proximal side, and he other long side is referred to as a distal side. The proximal side nears a user operating the keyboard device; and the distal side is the opposite side. The operation surface comprises a key unit and camera module. The key unit is positioned on the proximal side, wherein the key unit comprises a plurality of keys. The camera module is positioned on center of the distal side, wherein the camera comprises an active light emitter and a light sensor. The active light emitter emits light of a preset wave length. The light sensor detects light of the preset wave length. An angle between a border of a field of view of the light sensor and the operation surface is set at a particular angle thus user's hand is kept out of the field of view of the light sensor when the user's hand is manipulating the key unit. The processor comprises an image analyzer and an input mode switch. The image analyzer receives and analyzes an image taken by the camera module, and determines whether a preset gesture is identified in the image. The input mode switch switches input mode of the electronic device according to output of the image analyzer. When the preset gesture is identified in the image, the input mode switch switches the electronic device to a gesture input mode corresponding to the preset gesture; when the preset gesture is not identified in the image, the input mode switch switches the electronic device to a key input mode.

In accordance with some embodiments, the electronic device further comprises a screen. When the input mode switch switches the electronic device to a first gesture input mode, the processor controls the screen to display a cursor.

In accordance with some embodiments, under the first gesture input mode, the processor receives a click signal when size of a finger identified in the image changes quickly.

In accordance with some embodiments, under the first gesture input mode, the processor determines speed of the cursor according to speed or distance of moving of the identified finger, and controls the screen to display the cursor as moving at the determined speed of the cursor.

In accordance with some embodiments, the electronic device further comprises a screen. When the input mode switch switches the electronic device to a second gesture input mode, the processor controls the screen to display a previous page or a next page when a swiping gesture is identified.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
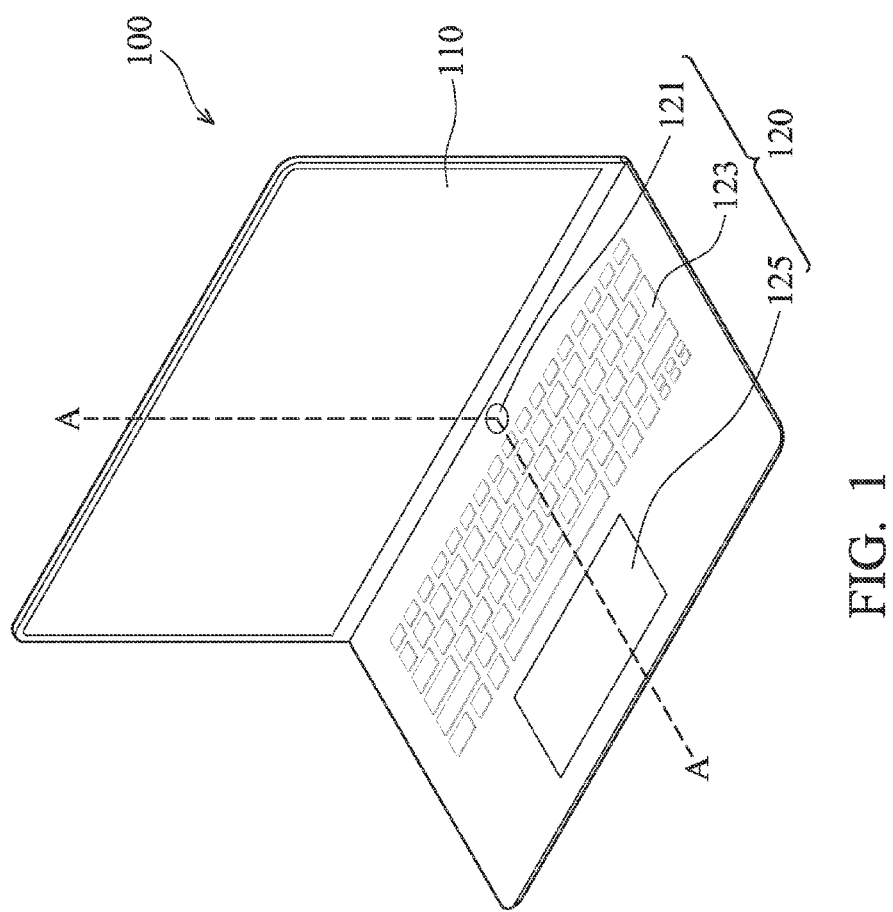
FIG. 1 is a front view of a laptop computer according to an exemplary embodiment.

FIG. 1 is a front view of a laptop computer according to an exemplary embodiment. Referring to FIG. 1, an embodiment of a laptop computer 100 primarily comprises a screen 110 and operation surface 120.

The screen 110 may be a general monitor without touch control function.

Figure 2:
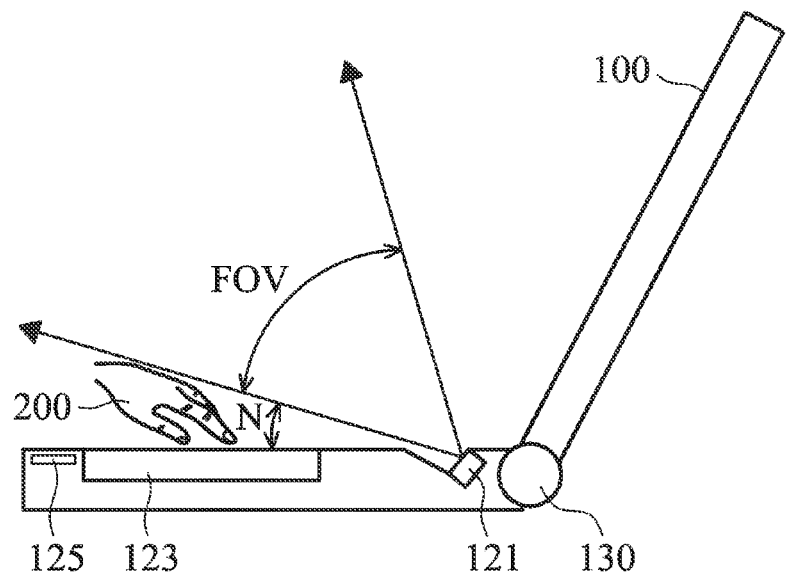
FIG. 2 is a sectional view along A-A in FIG. 1.

The operation surface 120 is substantially rectangular and is pivotally connected with the screen 110 via a pivot 130 (as shown in FIG. 2). One long side of the operation surface 120 is referred to as a proximal side, and the other long side is referred to as a distal side. The proximal side nears a user operating the keyboard device; and the distal side is the opposite side. The operation surface 120 comprises a camera module 121, a key unit 123, and a touchpad 125. These components are arranged on the operation surface 120, from the proximal side to the distal side, in the order of touchpad 125, key unit 123 and then camera module 121.

The touchpad 125 is a pointing device featuring a tactile sensor. The touchpad 125 has a specialized surface that can translate the motion and position of a user's fingers to a relative position on screen.

The key unit 123 may be a typewriter-style keyboard, comprising a plurality of keys. Generally, each press of a key typically corresponds to a single written symbol, such as a letter, a number or a character. Upon pressing a key of the key unit 123, a scancode output unit (not shown) outputs a scancode corresponding to the key being pressed to a processor (not shown) of the laptop computer 100 for further processing.

The camera module 121 is positioned on center of the distal side (near a pivot of the laptop computer 100), wherein the camera module 121 comprises an active light emitter and a light sensor. Structures of the camera module 121 are further described below. Images taken by the camera module 121 is then sent, via an image output unit (not shown) to a processor (not shown) of the laptop computer 100 for further processing.

In addition, in order to properly capture user's gesture, the camera module 121 is positioned at a particular angle (as shown in FIG. 2).

FIG. 2 is a sectional view along A-A in FIG. 1. As shown in FIG. 2, the camera module 121 is positioned according to a field of view (FOV) of the camera module 121. More specifically, the camera module 121 is tilted so that an angle between a border of a field of view of the camera module 121 and the operation surface 120 is set at a particular angle thus user's hand 200 is kept out of the field of view of the camera module 121 when the user's hand 200 is manipulating the key unit. According to this embodiment, an angle between a border of a field of view of the camera module 121 and the operation surface 120 is an angle of 40 degrees. In other words, the camera module 121 is tilted so that the border of the field of view is tilted at 40 degrees from a horizontal line. The present invention is not limited to this embodiment. The angle between a border of a field of view of the camera module 121 and the operation surface 120 can be set at any angle, as long as user's hand 200 is kept out of the field of view of the camera module 121 when the user's hand 200 is manipulating the key unit 123.

Figure 3:
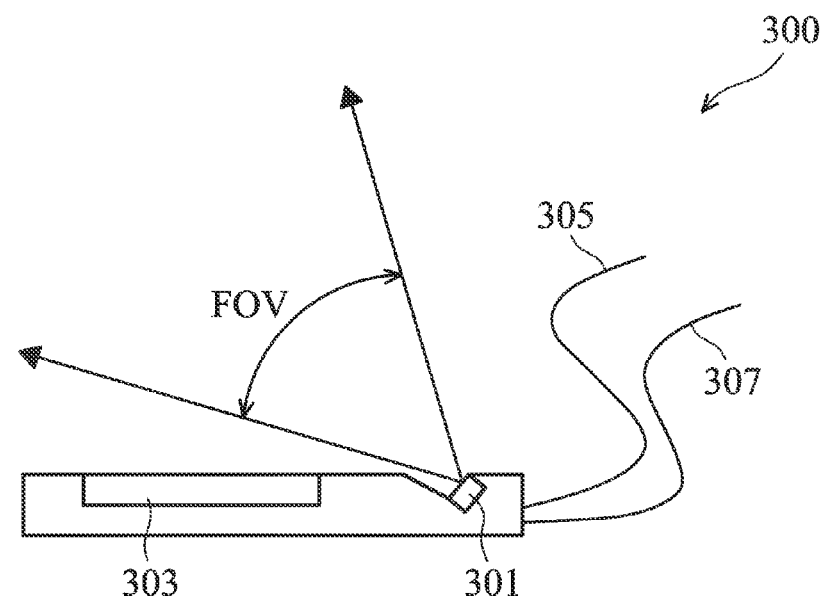
FIG. 3 is a schematic diagram of a keyboard device according to an exemplary embodiment.

FIG. 3 is a schematic diagram of a keyboard device according to an exemplary embodiment. The operation surface of keyboard device 300 is substantially rectangular, wherein one long side of the operation surface is referred to as a proximal side, and the other long side is referred to as a distal side. The proximal side nears a user operating the keyboard device; and the distal side is the opposite side. The operation surface comprises a camera module 301, a key unit 303. The camera module 301 is positioned on center of the distal side, wherein the camera module 301 comprises an active light emitter and a light sensor. An image taken by the camera module 301 is transferred to a computer device (not shown) connected to the keyboard device 300 via an image output unit 305. The image output unit can be a universal serial bus (USB).

The key unit 303 comprises a plurality of keys. Generally, each press of a key typically corresponds to a single written symbol, such as a letter, a number or a character. Upon pressing a key of the key unit 303, a scancode output unit 307 outputs a scancode corresponding to the key being pressed to a computer device (not shown) for further processing. The scancode output unit 307 can be a universal serial bus (USB).

Figure 4A:
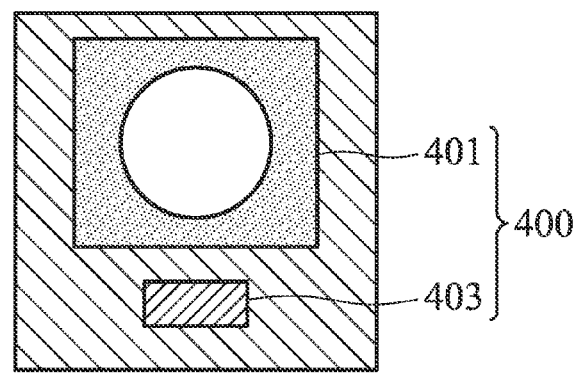
FIG. 4A is a top view of a camera module according to an exemplary embodiment.
Figure 4B:
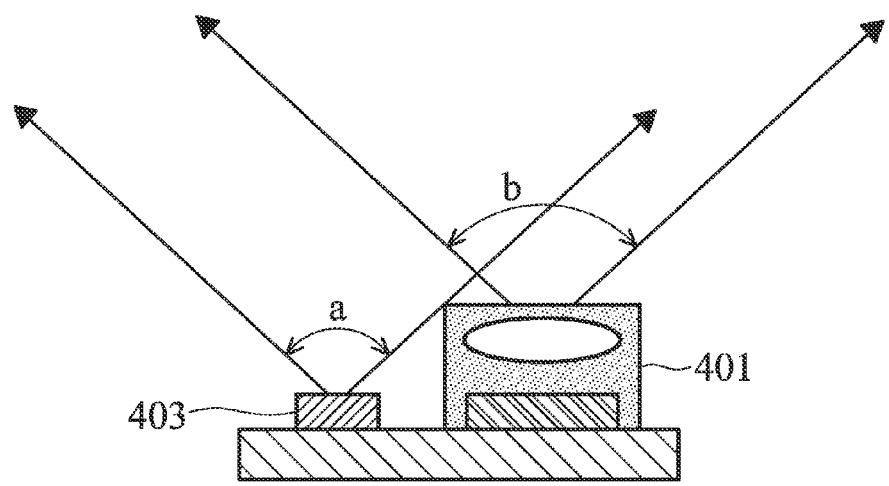
FIG. 4B is a view of a camera module from a short side of the keyboard device according to an exemplary embodiment.
Figure 4C:
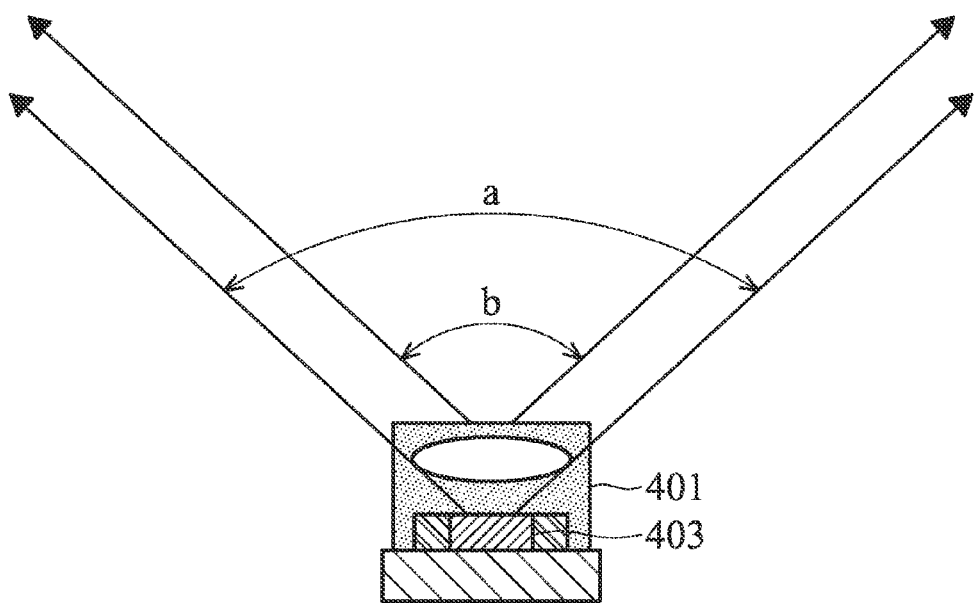
FIG. 4C is a view of a camera module from a long side of the keyboard device according to an exemplary embodiment.

FIGS. 4A~4C are schematic diagrams of a camera module according to an exemplary embodiment.

FIG. 4A is a top view of a camera module according to an exemplary embodiment. The camera module 400 comprises an active light emitter 403 and a light sensor 401. The light sensor 401 can be a CMOS (Complementary metal-oxide-semiconductor) sensor; the active light emitter 403 can be an infrared light source for emitting light at 850 nm or 940 nm. Impact of complicated background on the gesture identification can be alleviated by using infrared light. Therefore, resolving power of the camera module can be improved by using infrared light.

FIG. 4B is a view of a camera module from a short side of the keyboard device according to an exemplary embodiment; and FIG. 4C is a view of a camera module from a long side of the keyboard device according to an exemplary embodiment.

Referring to FIG. 4B, light sensor 401 can be positioned near the distal side of the keyboard device (i.e., near the pivot of the laptop computer). Angle 'a' indicates a range in which the active light emitter 403 emits light; and angle 'b' indicates a range in which light sensor 401 captures images. According to an embodiment, angle 'a' is larger than angle 'b'.

Referring to FIG. 4C, light sensor 401 can be positioned near the distal side of the keyboard device (i.e., near the pivot of the laptop computer). Angle 'a' indicates a range in which the active light emitter 403 emits light; and angle 'b' indicates a range in which light sensor 401 captures images. According to an embodiment, angle 'a' is larger than angle 'b'.

Figure 5:
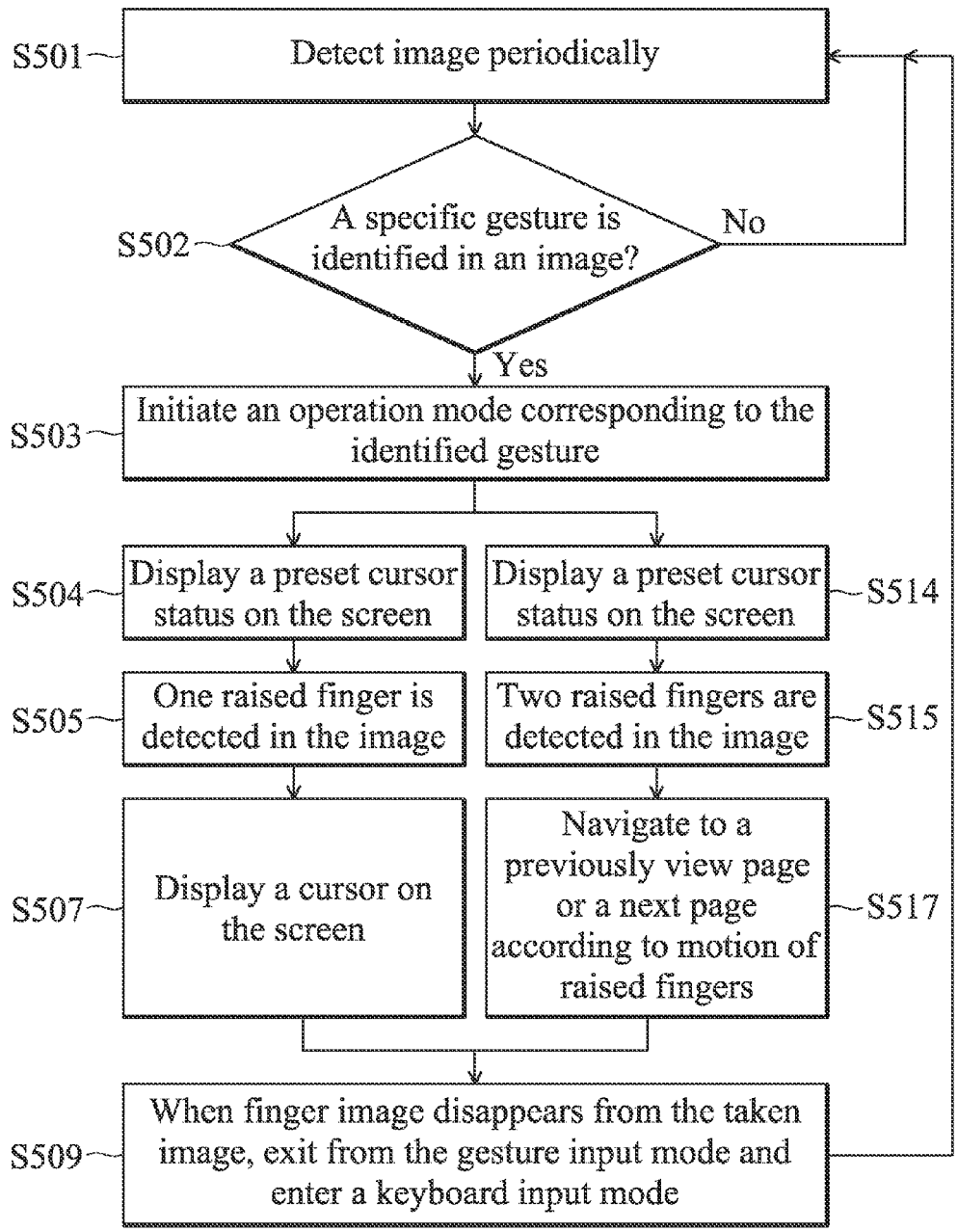
FIG. 5 is a flowchart of a method according to an exemplary embodiment.

FIG. 5 is a flowchart of a method according to an exemplary embodiment. The method can be implemented in the laptop computer 100 of FIG. 1, or in a system consisted of the keyboard device 300 and a computer device connected therewith, as shown in FIG. 3.

Referring to FIG. 5, in step S501, the light sensor 401 detects image periodically. For example, the light sensor 401 captures an image every second. Because the light sensor 401 is tilted (as shown in FIG. 2), user's hand will not be captured in an image taken by the light sensor 401 when the user's hand is manipulating the key unit. In this situation, the light sensor 401 can captures image at a lower frequency, and the user can manipulate the key unit as usual.

In step S502, it is determined whether a specific gesture is identified in an image taken by the light sensor 401. The specific gesture can be at least one pre-defined gesture. For example, it is determined whether one or two raised fingers are identified in the image taken by the light sensor 401. Each pre-defined gesture corresponds to a pre-defined operation mode. The determining step can be performed by a processor (not shown) of the laptop computer 100 or a processor (not shown) of a computer device associated with the keyboard device 300. If a specific gesture is identified in an image taken by the light sensor 401, the method proceeds to step S503; if no specific gesture is identified in an image taken by the light sensor 401, the method returns to step S501 to detect image periodically.

By defining a specific gesture for initiating a particular operation mode, the particular operation mode will not be initiated erroneously by unintentional actions (for example, the user runs his finger through his hair).

In step S503, an operation mode corresponding to the identified gesture is initiated. For example, a gesture input mode corresponding to the identified gesture is initiated.

The camera module detects images at a higher frequency under the gesture input mode.

In this embodiment, a gesture of 'raising one single finger' is defined for initiating the gesture input mode for cursor manipulation. In step S504, a preset cursor status is displayed on the screen for informing the user that the system is operating under the gesture input mode.

In step S505, the user raises his right index finger and puts the finger in the field of view (FOV) of the camera module, then it is determined that one raised finger is detected in the image taken by the camera module. In step S507, a cursor is displayed on the screen, and the user can move the cursor by simply moves the raised finger. In addition, a single-clicking can be done by bending and straitening the raised finger. Under this situation, size of an image of the raised finger changes quickly. For example, when the size of the image of the raised finger decreases and then increases immediately, it is determined a single-clicking is input by the user. Similarly, a double-clicking can be done by bending and straitening the raised finger twice. Under this situation, size of an image of the raised finger repeatedly changes twice. For example, when the size of the image of the raised finger decreases and then increases immediately, and then decreases and increases again, it is determined a double-clicking is input by the user.

In another embodiment, a gesture of 'raising two fingers' is defined for initiating the gesture input mode for page navigation. In step S514, a preset cursor status is displayed on the screen for informing the user that the system is operating under the gesture input mode.

In step S515, the user raises his right index finger and right middle finger and puts the raised fingers in the field of view (FOV) of the camera module, then it is determined that two raised fingers are detected in the image taken by the camera module. In step S517, the user can navigate to a previously view page or a next page by simply moving the raised fingers.

In step S509, when finger image disappears from the taken image because the finger moves out from the field of view (FOV) of the camera module, the system exits from the gesture input mode and enters a keyboard input mode.

As described, the present invention enables a user to interact with a computer (such as a laptop computer) using short-distance gestures. According to a conventional way of gesture control, a user has to raise his arm to conduct a gesture. On the contrary, according to the present invention, a user interacts with a computer by simply raising a finger and lays the rest part of the hand on a keyboard. In other words, the interaction can be realized by raising one single finger without raising an arm.

In addition, the keyboard integrated with camera module taught in this disclosure can implement function of a general mouse or touchpad. The keyboard integrated with camera module is suitable for, but not limited to, a laptop computer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A keyboard device, comprising a substantially rectangular operation surface, wherein one long side of the operation surface is referred to as a proximal side, which nears a user operating the keyboard device; and the other long side is referred to as a distal side; wherein the operation surface comprises:
    a key unit, positioned on the proximal side, comprising a plurality of keys;
    a camera module, positioned on center of the distal side, comprising:
        an active light emitter for emitting light of a preset wave length; and
        a light sensor for detecting light of the preset wave length;
        wherein an angle between a border of a field of view of the light sensor and the operation surface is set at a particular angle thus user's hand is kept out of the field of view of the light sensor when the user's hand is manipulating the key unit;
    the light sensor is positioned in a way by which when the user raises at least one finger and lays the rest part of the corresponding hand on the operation surface, only the raised finger enters the field of view of the light sensor; and
    a first angle indicates a range in which the active light emitter emits light, a second angle indicates a range in which the light sensor captures images, and the first angle is larger than the second angle.

2. The keyboard device as claimed in claim 1, wherein the active light emitter emits infrared light, and the light sensor detects the infrared light.

3. The keyboard device as claimed in claim 1, further comprising a signal generator, generating a control signal according to an image taken by the camera module, and transmitting the control signal to an electronic device associated with the keyboard device.

4. The keyboard device as claimed in claim 3, wherein the signal generator generates the control signal according to a gesture identified in the image taken by the camera module, and transmits the control signal to the electronic device associated with the keyboard device to direct the electronic device to switch to a corresponding gesture input mode.

5. The keyboard device as claimed in claim 3, wherein when no gesture is identified in the taken image, the signal generator generates and transmits the control signal to the electronic device associated with the keyboard device to direct the electronic device to switch to a corresponding key input mode.

6. The keyboard device as claimed in claim 1, further comprising a scancode output unit for outputting a scancode corresponding to the key being pressed.

7. The keyboard device as claimed in claim 1, further comprising an image output unit for outputting the image taken by the camera module.

8. An electronic device, comprising a keyboard and a processor, wherein:
   the keyboard comprises a substantially rectangular operation surface, wherein one long side of the operation surface is referred to as a proximal side, which nears a user operating the keyboard; and the other long side is referred to as a distal side; wherein the operation surface comprises:
   a key unit positioned on the proximal side, comprising a plurality of keys;
   a camera module positioned on center of the distal side, comprising:
   an active light emitter for emitting light of a preset wave length; and
   a light sensor for detecting light of the preset wave length, wherein an angle between a border of a field of view of the light sensor and the operation surface is set at a particular angle thus user's hand lays outside the field of view of the light sensor when the user is manipulating the key unit, the light sensor is positioned in a way under which when the user raises at least one finger and lays the rest part of the hand corresponding to the raised finger, only the raised finger is positioned in the field of view of the light sensor, a first angle indicates a range in which the active light emitter emits light, a second angle indicates a range in which the light sensor captures images, and the first angle is larger than the second angle;
   wherein the processor comprises:
   an image analyzer, receiving and analyzing an image taken by the camera module, and determining whether a preset gesture is identified in the image; and
   an input mode switch, switching input mode of the electronic device according to output of the image analyzer, when the preset gesture is identified in the image, switching the electronic device to a gesture input mode corresponding to the preset gesture; when the preset gesture is not identified in the image, switching the electronic device to a key input mode.

9. The electronic device as claimed in claim 8, further comprising a screen, when the input mode switch switches the electronic device to a first gesture input mode, the processor controls the screen to display a cursor.

10. The electronic device as claimed in claim 9, wherein, under the first gesture input mode, the processor receives a click signal when size of a finger identified in the image changes quickly.

11. The electronic device as claimed in claim 9, wherein, under the first gesture input mode, the processor determines speed of the cursor according to speed or distance of moving of the identified finger, and controls the screen to display the cursor as moving at the determined speed of the cursor.

12. The electronic device as claimed in claim 8, further comprising a screen, when the input mode switch switches the electronic device to a second gesture input mode, the processor controls the screen to display a previous page or a next page when a swiping gesture is identified.

* * * * *